United States Patent [19]

Jarret et al.

[11] 4,081,724

[45] Mar. 28, 1978

[54] VARIABLE RELUCTANCE ELECTRIC MOTOR

[75] Inventors: Jean Jarret, Paris; Jacques Jarret, Louveciennes, both of France

[73] Assignee: Societe Elpalux, Luxembourg

[21] Appl. No.: 733,158

[22] Filed: Oct. 18, 1976

[30] Foreign Application Priority Data

Oct. 21, 1975 France .................. 75 32144

[51] Int. Cl.² ........................... H02K 29/02
[52] U.S. Cl. .................... 318/138; 310/185
[58] Field of Search ........... 318/138, 254, 227, 230; 310/162, 163, 198, 257, 185, 197, 254

[56] References Cited

U.S. PATENT DOCUMENTS 3,740,630   6/1973   Jarret ........................ 318/138

*Primary Examiner*—Herman J. Hohauser

[57] ABSTRACT

A variable-reluctance electric motor comprises a stator of ferromagnetic material, having poles provided with induction windings and distributed in four equal groups. The motor is provided with at least one ferromagnetic material rotor ring having equidistant teeth and bearing switching means actuated by the rotation for distributing direct current to the stator windings. The windings and switching means are so combined that, during each advance of the rotor by one tooth pitch, each pole is subjected to two opposite switching operations staggered by a time equal to that taken by the motor for a one-fourth of a tooth pitch rotation. The stator poles are equidistant, each bearing one winding, and are number $(4kl)$, $k$ being at least equal to 2 and $l$ being any number. The rotor has $(lm)$ teeth, $m$ being an odd number greater than $(4k)$. The switching means are so actuated as to switch over the d.c. supply from one stator pole to another one every time the rotor advances by $(1/k)$ of a tooth pitch, and $m$ is so chosen that at any instant energized poles alternate with non-energized ones, except in the stator parts which have just undergone or are about to undergo switching.

3 Claims, 3 Drawing Figures

VARIABLE RELUCTANCE ELECTRIC MOTOR

BACKGROUND OF THE INVENTION

1. Field of the Invention

The invention relates to a variable-reluctance electric motor, more particularly a motor comprising a stator ring made of ferromagnetic material and having poles provided with induction windings distributed into four equal groups, at least one rotor ring of ferrogmagnetic material provided with equidistant teeth cooperating with the stator windings, and switching means actuated by the rotation of the rotor so as to distribute the supply of the stator windings from a d.c. voltage source, the windings and switching means being actuated so that, during each advance of the rotor by one tooth pitch, each pole is subjected to two opposite switching operations and, from one group of poles to the next, the switching operations are staggered by a time equal to the time taken by the motor to advance by a quarter of a tooth pitch.

2. Description of the Prior Art

Motors of this kind have known advantages (e.g. as disclosed in U.S. Pat. No. 3,435,266 of Mar. 25, 1969 and No. 3,740,630 of June 19, 1973) with regard to the production of a constant torque at a variable speed.

However, such machines are frequently too noisy owing to the rapid variations in the stator currents and the magneto-mechanical forces. In addition, the high amplitude of the variations in current may interfere with the d.c. source. An object of the invention is to obviate these disadvantages.

SUMMARY OF THE INVENTION

To this object of the invention end, a variable-reluctance electric motor of the initially-defined kind is characterized according to the invention in that the stator poles are equidistant, each bear an individual winding and are equal in number to 4 $kl$ (where $k \geq 2$ and $l$ is any number), the rotor teeth are in number equal to $lm$ (where m is an odd number greater than 4 $k$) and the switching means are actuated so as to switch over the supply between two stator poles at each rotor advance of $1/4k$ of a tooth pitch, and m is choosen so that at each instant, energized poles alternate with non-energized poles except in the stator regions which have just been switched or are about to be switched.

Thus, as will be seen more clearly hereinafter, the magnetomechanical forces are more efficiently distributed along the air gap and the rotor deformation, like that of the stator, remains substantially constant, thus substantially reducing the noise level produced by the machine.

Advantage is taken of the fact that the stator studs are supplied in approximately alternating manner, so as to connect the corresponding windings to the switching means in such a manner that the radial direction of magnetic flux alternates from one pair of adjacent studs to the next. This results in a saving in ferro-magnetic material by reducing the cross-sections of the stator and rotor rings.

BRIEF DESCRIPTION OF THE DRAWINGS

The invention will be more clearly understood from the following detailed description of a preferred embodiment and the accompanying drawings, in which.

DESCRIPTION OF THE PREFERRED EMBODIMENTS

Figure 1:
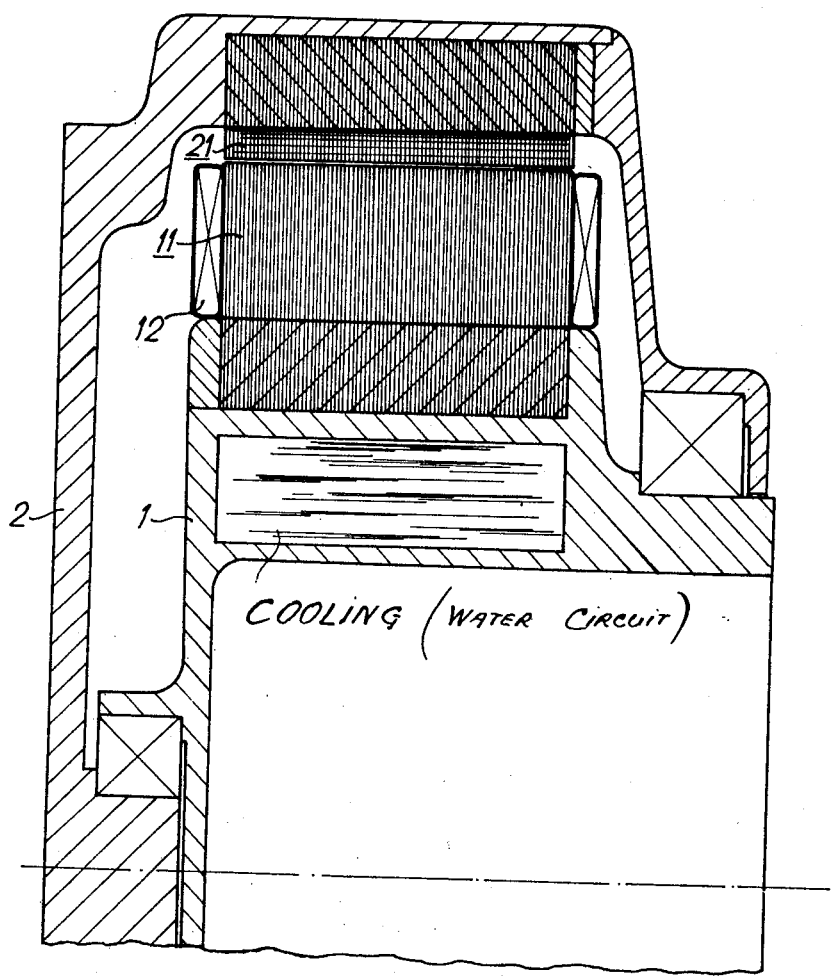
FIG. 1 is a diagrammatic axial view in half-section through a variable-reluctance electric motor according to the invention (without switching means)
Figure 2:
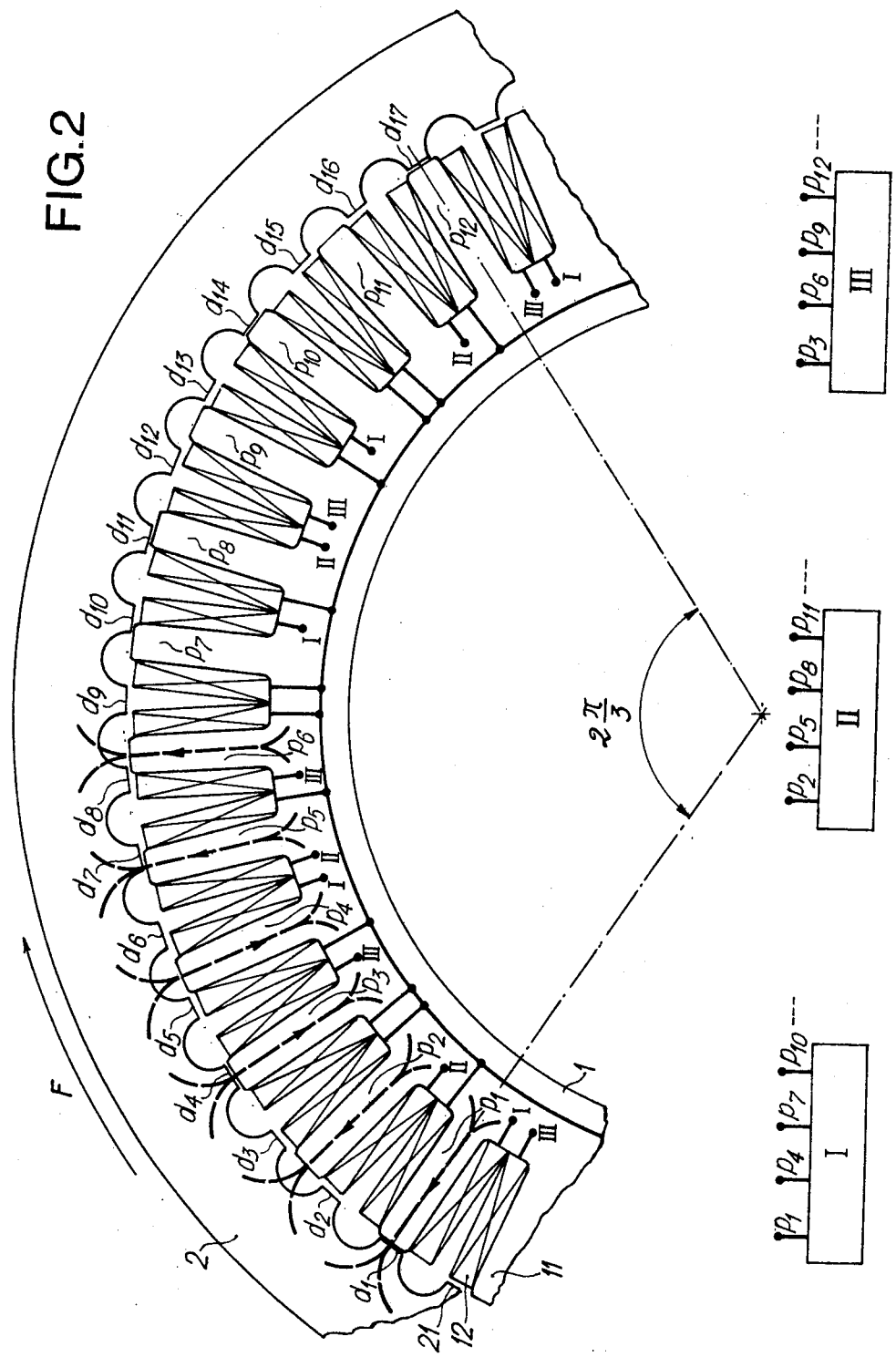
FIG. 2 is a one-third diagrammatic cross-section of the same motor showing the cooperation between the stator poles and the rotor teeth (and also showing the switching means)

A variable-reluctance motor of the kind shown in FIGS. 1 and 2 comprises the following main parts:

A stator 1 comprising a ferromagnetic ring of equidistant poles 11, the number of poles being equal to a multiple of 12 (3 × 12 in this case), each pole having an induction winding 12;

A rotor 2 having a ferromagnetic ring bearing equidistant teeth 21, the number of teeth being equal to the same multiple as before, but of 17 (3 × 17 in this case); and Switching means comprising 3 switches I, II, III (shown in FIG. 2 only) each comprising four static interruptors (transistors or thyristors). The interruptors are actuated by an electronic device (not shown) which detects the position of the rotor teeth with respect to the stator poles and which opens or closes them in a sequence which will be described in greater detail hereinafter.

In FIG. 2, which covers an angle $2\pi/3$ (120°) and where it is assumed that the rotor is driven in the clockwise direction represented by arrow F, any 12 successive stator poles are denoted by $p_1, p_{12}$ and any 17 successive rotor teeth are denoted by $d_1, d_{17}$ so that, at the instant under consideration, the axis of tooth $d_1$ coincides with the axis of pole $p_1$. As also shown in FIG. 2, the 12 sucessive poles $p_1$-$p_{12}$ have their windings connected to switches I, II, III, four windings being connected to each switch. All the windings are connected to the switches at one end only, the other end of the windings being connected to a common point inside the machine and without an external outlet.

Since 12 polar pitches correspond to the same central angle as 17 tooth pitches, it is easy, starting from the rotor position shown, to calculate the angle through which the teeth need to travel to reach the poles which are nearest in the direction of motion. These rearward shifts of the teeth with respect to the poles are shown in Table 1 hereinafter.

TABLE 1

| Delay of | | |
|---|---|---|
| tooth $d_1$ with respect to pole $p_1$: | | 0 |
| tooth $d_2$ with respect to pole $p_2$: | $2\frac{\pi}{3}(\frac{1}{12} - \frac{1}{17}) =$ | 5 twelfths of a tooth pitch |
| tooth $d_3$ with respect to pole $p_3$: | $2\frac{\pi}{3}(\frac{2}{12} - \frac{2}{17}) =$ | 10 twelfths of a tooth pitch |
| tooth $d_4$ with respect to pole $p_4$: | $2\frac{\pi}{3}(\frac{2}{12} - \frac{3}{17}) =$ | 15 twelfths of a tooth pitch |
| tooth $d_5$ with respect to pole $p_4$: | $2\frac{\pi}{3}(\frac{3}{12} - \frac{4}{17}) =$ | 3 twelfths of a tooth pitch |
| tooth $d_6$ with respect to pole $p_5$ | | 8 twelfths of a tooth pitch |
| tooth $d_7$ with respect to pole $p_6$ | | 13 twelfths of a tooth pitch |

TABLE 1-continued

| Delay of | |
|---|---|
| tooth $d_8$ with respect to pole $p_6$ | 1 twelfth of a tooth pitch |
| tooth $d_9$ with respect to pole $p_7$ | 6 twelfths of a tooth pitch |
| tooth $d_{10}$ with respect to pole $p_8$ | 11 twelfths of a tooth pitch |
| tooth $d_{11}$ with respect to pole $p_9$ | 16 twelfths of a tooth pitch |
| tooth $d_{12}$ with respect to pole $p_9$ | 4 twelfths of a tooth pitch |
| tooth $d_{13}$ with respect to pole $p_{10}$ | 9 twelfths of a tooth pitch |
| tooth $d_{14}$ with respect to pole $p_{11}$ | 14 twelfths of a tooth pitch |
| tooth $d_{15}$ with respect to pole $p_{11}$ | 2 twelfths of a tooth pitch |
| tooth $d_{16}$ with respect to pole $p_{12}$ | 7 twelfths of a tooth pitch |
| tooth $d_{17}$ with respect to next $p_1$ | 12 twelfths of a tooth pitch |

Note that in the third column of the table, the transition from one tooth to the next in the downward vertical direction is made by adding 5 and taking the remainder when the thus-obtained sum is divided by 12.

At the rotor position shown, switches I, II, III perform the following switching and holding operations:

Disconnecting pole $p_1$, the axis of which has just coincided with the axis of tooth $d_1$;

Connecting pole $p_7$, relative to the axis of which, the axis of the newly-arrived tooth $d_9$ lags by half a tooth pitch (six-twelfths of the pitch);

Maintaining the previously-established connection to poles $p_6$, $p_{11}$, $p_4$, $p_9$, $p_2$, with respect to the axes of which the axes of the newly-arrived teeth $d_8$, $d_{15}$, $d_5$, $d_{12}$, $d_2$ lag by 1, 2, 3, 4, 5, 6 twelfths of a tooth pitch respectively, and Keeping poles $p_{12}$, $p_5$, $p_{10}$, $p_3$, $p_8$ disconnected.

It can be seen, therefore, that during two rotor rotations of a twelfth of a tooth pitch around the position shown, the energized poles ae those underlined in the following two lines:

$p_1 p_2 p_3 p_4 p_5 p_6 p_7 p_8 p_9 p_{10} p_{11} p_{12}$ $p_1 p_2 p_3 p_4 p_5 p_6 p_7 p_8 p_9 p_{10} p_{11} p_{12}$ which, in both cases, means that exactly six poles are energized out of 12 and the non-energized poles substantially alternate with energized poles.

Clearly, in order to rotate the rotor, the switches must perform the sequence of operations shown by Table 2 hereinafter:

TABLE 2

| Position of rotor | Pole at current is disconnected | Pole at current is connected |
|---|---|---|
| Position shown | $p_1$ | $p_7$ |
| After rotation through 1 twelfth of a tooth pitch | $p_6$ | $p_{12}$ |
| After rotation through 2 twelfth of a tooth pitch | $p_{11}$ | $p_5$ |
| After rotation through 3 twelfth of a tooth pitch | $p_4$ | $p_{10}$ |
| After rotation through 4 twelfth of a tooth pitch | $p_9$ | $p_3$ |
| After rotation through 5 twelfth of a tooth pitch | $p_2$ | $p_8$ |
| After rotation through 6 twelfth of a tooth pitch | $p_7$ | $p_1$ |
| After rotation through 7 twelfth of a tooth pitch | $p_{12}$ | $p_6$ |
| After rotation through 8 twelfth of a tooth pitch | $p_5$ | $p_{11}$ |
| After rotation through 9 twelfth of a tooth pitch | $p_{10}$ | $p_4$ |
| After rotation through 10 twelfth of a tooth pitch | $p_9$ | $p_3$ |
| After rotation through 11 twelfth of a tooth pitch | $p_8$ | $p_2$ |

It will be noted that, in the second and third columns of the Table, the transition from a stud to the next is either:

vertically in the downward direction by adding 5 (= 17−12) and taking the remainder when the thus-obtained sum is divided by 12; or

- horizontally in either direction by adding 6 (= 12/2) and taking the remainder when the thus-obtained sum is divided by 12.

As shown in FIG. 2, switching operations at the rate of rotation through a twelfth of a tooth pitch are made:

— by switch I for changing over the supplies of poles $p_1$, $p_7$;

— by switch II for similarly changing over poles $p_6$, $p_{12}$;

— by switch III for similarly changing poles $p_{11}$, $p_5$;

— by switch I again for similarly switching the poles $p_4$, $p_{11}$ and so on, the switches operating in an invariable order (in the present case I, III, II, allowing for the distribution of poles between switches as shown in FIG. 2).

Figure 3:
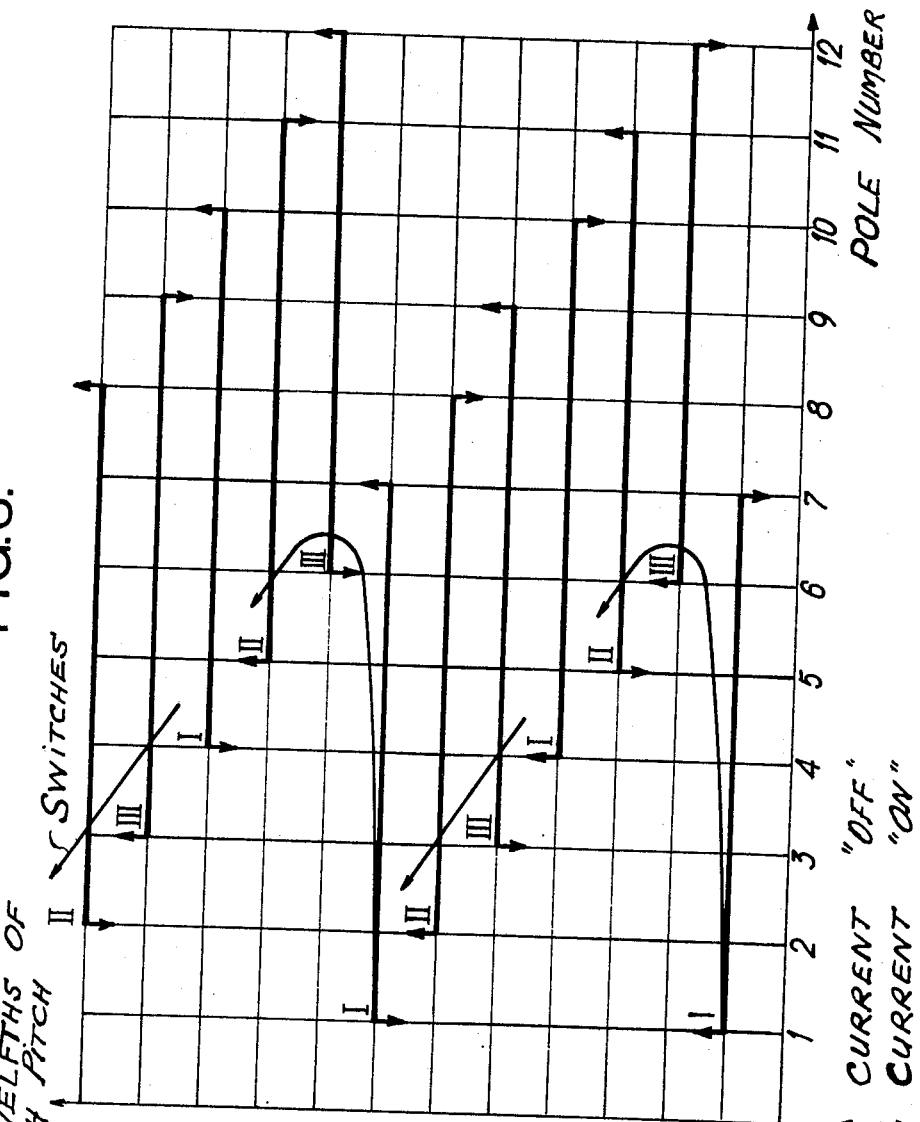
FIG. 3 shows a time diagram of switching.

In other words, switching operations occur in the manner shown in FIG. 3.

If $k$ is the number of switches, $4kl$ is the number of stator poles and m is the number of teeth, the combination shown corresponds to $k = 3$, $m = 17$; the number of poles is $4 \times 3 \times l = 12l$ (36 in this case) and the number of teeth is $17l$ (51 in this case).

This combination is not unique. For example, one could take the combination $k—m$ in the set comprising 2-12, 3-19 4-23 in which case the poles would be switched in the following order in the case of 8 poles, 12 poles and 16 poles respectively

| − 1, 4, 7, 2, 5, 8, 3, 6 | (period $11 - 8 = 3$) |
| − 1, 8, 3, 10, 5, 12, 7, 2, 9, 4, 11, 6 | (period $19 - 12 = 7$) |
| − 1, 8, 15, 6, 13, 4, 11, 2, 9, 16, 7, 14, 5, 12, 3, 10 | (period $23 - 16 = 7$) |

In view of the preceding system (i.e. approximate alternation of energized and non-energized poles) it is advantgeous to connect the stator windings so that the direction of the magnetic flux in the poles (which is constant, like the direction of the current in the corresponding winding) alternates from one pair of adjacent poles to the next one. Thus, the flux (shown in chain-dotted lines in FIG. 2) will always be e.g. from the interior towards the exterior in poles $p_1$, $p_2$, $p_5$, $p_6$, $p_9$, $p_{10}$ and in the opposite direction in poles $p_3$, $p_4$, $p_7$, $p_8$, $p_{11}$, $p_{12}$. Consequently, the resultant fluxes in the stator and rotor rings will be compensated and require a smaller cross-section of ferromagnetic material, other things being equal.

What we claim is:

1. A variable-reluctance electric motor comprising a stator ring made of ferromagnetic material and having poles provided with induction windings distributed into four equal groups, at least one rotor ring of ferromagnetic material provided with equidistant teeth cooperating with the stator windings, and switching means actuated by the rotation of the rotor so as to distribute the supply of the stator windings from a d.c. voltage source, the windings and switching means being actuated so that, during each advance of the rotor by one tooth pitch, each pole is subjected to two opposite switching operations and, from one group of poles to the next one, the switching operations are staggered by a time equal to the time taken by the motor to advance by a quarter of a tooth pitch, characterized in that the stator poles (11) are equidistant, each bear an individual winding (12) and are equal in number to $4kl$ (where $k \geq 2$ and $l$ is any number), the rotor teeth (21) are in number equal to $lm$ (where m is an odd number greater than $4k$) and the switching means (I, II, III) are actuated so as to switch over the supply between two stator poles at each rotor advance of $\frac{1}{4}k$ of a tooth pitch, and m is chosen so that at each instant, energized poles alternate with non-energized poles except in the stator regions which have just been switched or about to be switched.

2. An electric motor according to claim 1, in which the combination $k$–$m$ is chosen from among the following: 2–11, 3–17, 3–19, 4–23.

3. An electric motor according to claim 1, in which the stator windings (12) are connected to the switching means (I, II, III) so that the radial direction of the magnetic flux alternates from one pair of adjacent poles to the next one.

* * * * *